Oct. 18, 1960     J. V. CROTTY     2,956,604
LOCKING KEY COUPLED TO LOCK NUT BY SLIDING SLEEVE
Filed Sept. 30, 1958
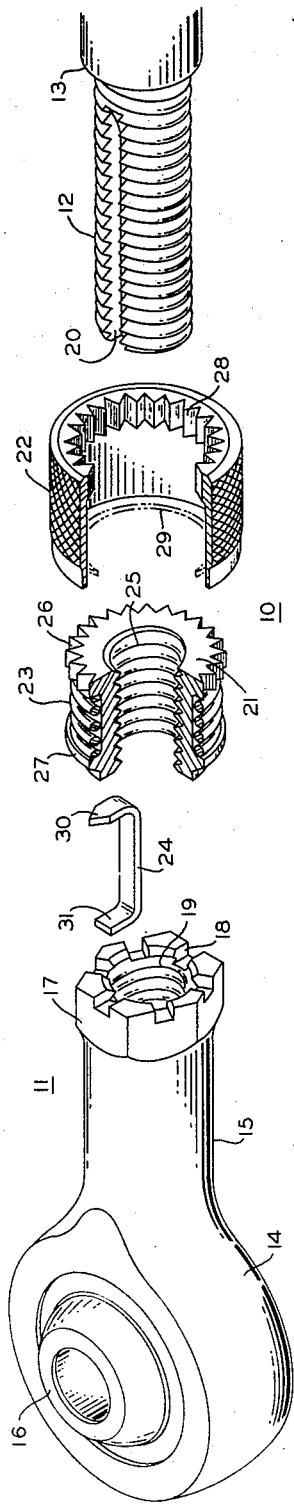
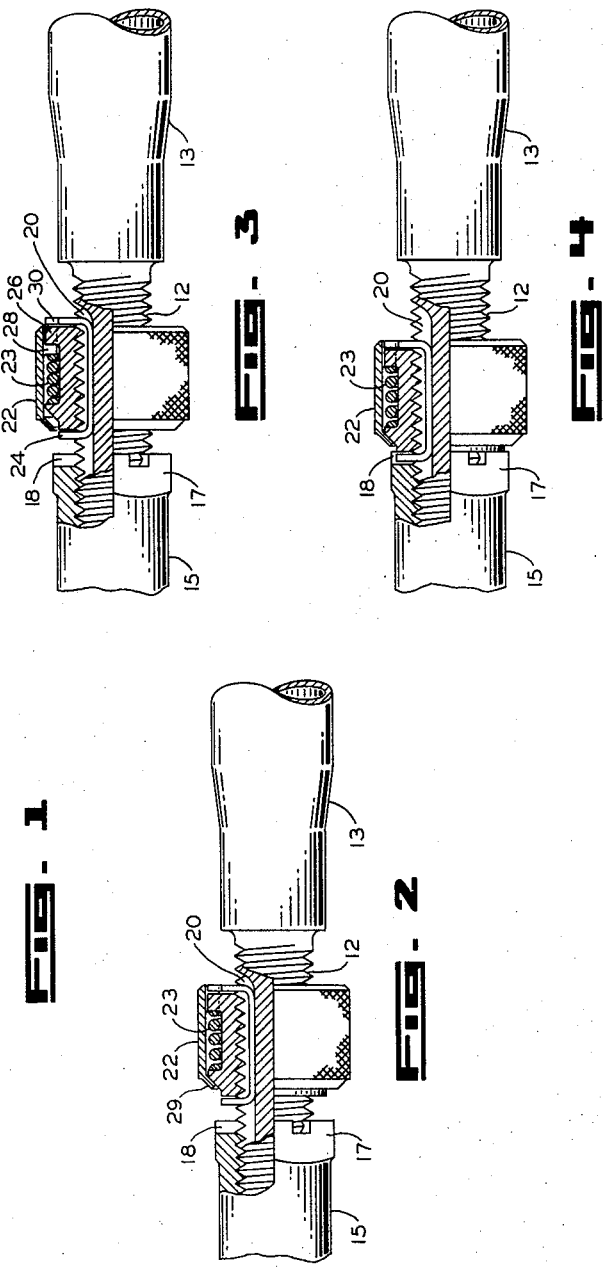
INVENTOR.
JOHN V. CROTTY
BY
ATTORNEY

United States Patent Office 2,956,604
Patented Oct. 18, 1960

2,956,604

LOCKING KEY COUPLED TO LOCK NUT BY SLIDING SLEEVE

John V. Crotty, 6805 Standering, Fort Worth, Tex.

Filed Sept. 30, 1958, Ser. No. 764,372

1 Claim. (Cl. 151—8)

My invention relates to locking devices and in particular provides a lock nut construction for securing a rotatable piece on an elongated member, such as a rod, bolt, stud or the like. The lock nut construction of my invention includes a position locking device for securing the lock nut construction, the piece to be held, and the elongated member against relative rotational movement.

It is thus an important object of my invention to provide a lock nut construction which can be readily rotated to engage or disengage with the piece which is to be secured and which when seated in position is positively locked in such position to prevent inadvertent loosening of the lock nut by vibration or other causes and which when so seated positively engages the piece which is to be secured in position.

Another object of my invention is to provide a lock nut construction for the above stated purpose, and which does not require use of tie wire.

Another object of my invention is to provide an improved lock nut construction for the above stated purpose, and which may be readily manipulated to either the locked or unlocked position without the use of any tools.

These and other objects of my invention are essentially obtained employing a construction comprising a locking sleeve which slidingly engages the exterior of a lock nut axially to prevent relative rotational displacement of the sleeve with respect to the lock nut. The locking sleeve is spring biased to a position which also engages a clip which passes beneath the lock nut and which is axially slidable in a longitudinal channel on the elongated member which receives the lock nut. The clip by reason of its reception in a longitudinal channel is held in fixed angular position with respect to the elongated member. At the same time the clip is turned up at its ends to embrace the ends of the lock nut to prevent its axial movement relative to the lock nut. At one end the clip is provided with means for axially engaging the locking sleeve to prevent its rotational movement relative to the locking sleeve and lock nut when the clip is engaged with the locking sleeve. At its other end the clip is designed to engage axially with the particular piece which is to be retained in position on the elongated member so to prevent rotational movement of the particular piece relative to said elongated member.

In a particular aspect the lock nut construction of my invention has particular applicability in retaining nuts, rod end bearings and the like on a threaded member, such as a bolt or stud. In these instances the piece retained on the bolt or stud is suitably provided with radial slots spaced at intervals about its end face facing the lock nut construction which axially receive the turned up end of the clip. Thus the lock nut construction of my invention can be employed to secure such pieces by withdrawing the locking sleeve lengthwise of the lock nut to release the clip from engagement with the locking sleeve. In this position the lock nut construction is threaded down against the nut, end bearing or other piece which is to be secured until the clip engages one of the radial slots in such piece. The locking sleeve is then released, re-engaging the clip, whereby the bearing or nut is held in fixed angular position by the clip which in turn is held in fixed axial position so that it cannot be withdrawn since its engagement with the locking sleeve prevents rotation of the lock nut.

For a more complete understanding of the principles of my invention reference is made to the drawings in which:

Fig. 1 is an exploded, partially sectioned view showing a lock nut construction in accordance with my invention, as employed to secure a rod end bearing to a rod;

Fig. 2 is a fragmentary, sectional view of the devices shown in Fig. 1 illustrating the position of my locking device prior to engagement with the shank of the rod end bearing;

Fig. 3 is a view similar to Fig. 2 illustrating the releasing action of the locking sleeve to permit the locking device to be threaded down to the bearing shank; and, Fig. 4 is a view similar to Figures 2 and 3 showing the locking device in operative locked position.

In the drawings, the reference numeral 10 designates a lock nut construction in accordance with my invention for securing a rod end bearing 11 on the threaded end 12 of a rod 13.

Rod end bearing 11 is conventional and typically includes an annular ring 14 mounted on one end of a shank 15 and retaining a self-aligning bearing 16. At its end opposite bearing 16 shank 15 terminates in an integral hex-nut 17 which is provided with a series of equally spaced radial end slots 18. Nut 17 and shank 15 are provided with a central, threaded bore 19 for receiving the threaded end 12 of rod 13. Threaded end 12 of rod 13 is also provided with a longitudinal slot 20.

Locking device 10 includes four principal members, a lock nut 21, a locking sleeve 22, a helical compressive spring 23 and a clip 24.

Lock nut 21 is provided with an open threaded center 25 for rotational engagement with threaded end 12 of rod 13. At one end lock nut 21 is provided with an annular series of equally spaced longitudinal splines, i.e., radial teeth, 26. Near its other end lock nut 21 is provided with a radially extended annular flange, i.e., shoulder 27 defining between it and splines 26 a shallow recess which receives helical spring 23.

Locking sleeve 22, which is positioned coaxially over lock nut 21, at its end adjacent splines 26 on lock nut 21 is provided with an annular series of equally spaced internal, longitudinal splines 28 which axially engage splines 26. The other end of sleeve 22 is spun or flared inwardly over shoulder 27 as indicated at 29 to form a lip which abuts shoulder 27. In this position internal splines 28 terminate at their inner ends adjacent to inner ends of splines 26 such that any movement of sleeve 22 withdrawing end 29 from its abutting position against shoulder 27 causes the inner ends of splines 28 to abut spring 23 and to compress it. The number of turns of spring 23 is arranged such that spring 23 is fully compressed when sleeve 22 moves axially relative to nut 21 a distance short of withdrawing splines 28 from engagement with splines 26. Splines 28 are, moreover, of greater length than splines 26 such that in the normal position of sleeve 22, under the biasing of spring 23, splines 28 project beyond the outer ends of splines 26.

Clip 24 is positioned in slot 20 in rod 13 beneath lock nut 21. Clip 24 has a width and depth permitting its free axial movement in slot 20 but substantially preventing any rotational movement of clip 24. At its end 30 adjacent splines 26, clip 24 is turned outwardly adjacent to splined end 26 of nut 21 and is shaped in the form of a tooth of dimensions to permit axial engagement of clip end 30 with splines 28 where the latter project beyond splines 26 in the normally biased position of locking sleeve 22 relative to nut 21. The other end 31 of clip 24 is turned outwardly adjacent to shouldered end 27 of nut 21 so that clip 24 embraces nut 21 loosely enough to permit nut 21 to rotate relative to clip 24.

In Fig. 2, locking device 10 is shown in position on the threaded end 12 of rod 13 but backed off from nut 17 of rod end bearing 11, which is also threaded on end 12 of rod 13. When the precise position of rod end bearing 11 relative to rod 13 has been set and a radial slot 18 of bearing 11 is positioned in axial alignment with longitudinal slot 20 in rod 13, sleeve 22 is pushed toward bearing 11 disengaging splines 28 from tooth end 30 of clip 24 as shown by Fig. 3. When sleeve 22 and clip 24 are so disengaged, nut 21, spring 23 and sleeve 22, which carries nut 21 with it by reason of engagement by splines 26 and 28, to slide clip 24 toward nut 17 of bearing 11 until end 31 of clip 24 is axially received in one of slots 18. Locking sleeve 22 is then released and under the biasing of spring 23, slides away from bearing 11, engaging tooth end 30 of clip 24 between two of splines 28 as they extend beyond the ends of splines 26, as shown by Fig. 4. In this position clip 24 locks sleeve 22 and bearing 11 in a manner preventing their relative rotational movement on rod 13. Since splines 28 not only engage clip 24 but also splines 26 of nut 21, nut 21 is also prevented from rotating and hence cannot be inadvertently backed off to release clip 24 from engagement in a slot 18. Accordingly, rod end bearing 11 is then locked in position on rod 13.

While I have shown my invention in only one form, it will be obvious to those skilled in the art that it is not so limited, but it is susceptible of various changes and modifications without departing from the spirit thereof.

I claim:

A lock nut construction for securing a piece having a radially slotted end against rotational movement on a threaded elongated member having a longitudinal slot which construction includes a lock nut having a threaded bore for axially receiving and rotatably engaging with said elongated member, a plurality of longitudinal splines spaced about said lock nut, a locking sleeve positioned about said lock nut, a plurality of longitudinal splines on the interior surface of said sleeve spaced to engage slideably said sleeve on said nut axially, a clip extending through the bore of said lock nut and axially slideable in said slot along said elongated member, the ends of said clip embracing the ends of said lock nut, one end of said clip having a tooth adjacent to a portion of said interior splines on said locking sleeve for receiving and axially engaging said locking sleeve at one position of said locking sleeve relative to said lock nut, the other end of said clip being axially engageable with a radial slot in the end of said piece, and resilient means biasing said locking sleeve relative to said lock nut toward said position axially engaging said locking sleeve and clip.

References Cited in the file of this patent

UNITED STATES PATENTS

| | | |
|---|---|---|
| 529,970 | Smouse | Nov. 27, 1894 |
| 1,527,552 | Hope | Feb. 24, 1925 |
| 1,629,726 | Morse | May 24, 1927 |
| 2,728,895 | Quackenbush | Dec. 27, 1955 |
| 2,821,419 | Walton | Jan. 28, 1958 |